(12) United States Patent
Kosugi et al.

(10) Patent No.: US 8,800,460 B2
(45) Date of Patent: Aug. 12, 2014

(54) SHIP

(75) Inventors: Keiko Kosugi, Tokyo (JP); Katsuhiko Mizuno, Tokyo (JP); Vittorio Garroni Carbonara, Genoa (IT); Peter Albrecht, Turku (FI); Antti Yrjanainen, Turku (FI); Anna-Liisa Syrila, Turku (FI); Tuomas Helin, Turku (FI); Toni Kuokkanen, Turku (FI)

(73) Assignees: Nippon Yusen Kabushiki Kaisha, Tokyo (JP); Monohakobi Technology Institute Co., Ltd., Tokyo (JP)

( * ) Notice: Subject to any disclaimer, the term of this patent is extended or adjusted under 35 U.S.C. 154(b) by 284 days.

(21) Appl. No.: 13/264,272

(22) PCT Filed: Apr. 15, 2009

(86) PCT No.: PCT/JP2009/057620
§ 371 (c)(1),
(2), (4) Date: Dec. 30, 2011

(87) PCT Pub. No.: WO2010/119538
PCT Pub. Date: Oct. 21, 2010

(65) Prior Publication Data
US 2012/0090520 A1 Apr. 19, 2012

(51) Int. Cl.
*B63B 25/00* (2006.01)
*B63B 3/08* (2006.01)
*B63B 35/00* (2006.01)

(52) U.S. Cl.
USPC .......................... 114/72; 114/77 R; 114/39.21

(58) Field of Classification Search
CPC ........ B63B 25/22; B63B 25/004; B63B 25/18
USPC .......................................................... 114/72
See application file for complete search history.

(56) References Cited

U.S. PATENT DOCUMENTS 2,551,066 A * 5/1951 Speer .......................... 414/142.8
3,165,211 A * 1/1965 Ablett et al. ................ 414/140.1
(Continued)

FOREIGN PATENT DOCUMENTS

DE 3402520 A1 * 8/1985
JP 47-13943 4/1972
(Continued)

OTHER PUBLICATIONS

International Search Report for U.S. Appl. No. PCT/JP2009/057620 dated Jul. 14, 2009.

*Primary Examiner* — Lars A Olson
*Assistant Examiner* — Andrew Polay
(74) *Attorney, Agent, or Firm* — McCormick, Paulding & Huber LLP

(57) ABSTRACT

This ship 10 is a ship for transporting cargos such as containers, and it is possible to efficiently perform the cargo handling operation for cargos. A lower hold 16 is provided below a deck 15 in a hull 14. The deck 15 is provided with protruding portions 17 and 18 protruding in the right and left side directions of the hull, and a plurality of frameworks 21 each including vertical pillars 22 and 23 fixed to the respective protruding portions 17 and 18 and a horizontal beam 24 through which the vertical pillars 17 and 18 are connected to each other are provided for the deck 15. Openable partition covers 25 are provided between frameworks adjacent to each other, and an upper hold 26 is formed on the deck 15 by the partition covers 25 and the deck 15. The cargo handling operation for the lower hold 16 is performed by an inboard crane 33 provided in the lower hold 16, and at the same time, the cargo handling operation for the upper hold 26 is performed by a quay crane 37.

6 Claims, 11 Drawing Sheets

(56) References Cited

U.S. PATENT DOCUMENTS

| | | | |
|---|---|---|---|
| 4,043,285 A * | 8/1977 | Nordstrom | 114/72 |
| 4,138,961 A * | 2/1979 | Roper | 114/72 |
| 4,666,356 A * | 5/1987 | Newbury | 414/788.2 |
| 5,263,429 A | 11/1993 | Brinkmann | |
| 5,863,228 A * | 1/1999 | Tether | 440/6 |
| 5,868,092 A * | 2/1999 | Milidragovic | 114/102.1 |
| 6,516,737 B2 * | 2/2003 | Le Coz et al. | 114/72 |
| 7,103,935 B2 * | 9/2006 | Hill | 14/71.3 |
| 2010/0050919 A1 * | 3/2010 | Keck | 114/271 |

FOREIGN PATENT DOCUMENTS

| | | | | |
|---|---|---|---|---|
| JP | 57-157596 | 10/1982 | | |
| JP | 59-111792 | 7/1984 | | |
| JP | 61-27785 | 2/1986 | | |
| JP | 62275889 A | * 11/1987 | | B63B 25/00 |
| JP | 5139378 A | 6/1993 | | |
| JP | 5-221381 A | 8/1993 | | |
| JP | 6-56073 A | 3/1994 | | |
| JP | 2002-315195 A | 10/2002 | | |
| JP | 2006-213229 A | 8/2006 | | |

* cited by examiner

SHIP

CROSS REFERENCE TO RELATED APPLICATIONS

This application is entitled to the benefit of and incorporates by reference essential subject matter disclosed in International Patent Application No. PCT/JP2009/057620 filed on Apr. 15, 2009.

TECHNICAL FIELD OF THE INVENTION

The present invention relates to a ship for transporting cargos such as containers.

BACKGROUND OF THE INVENTION

In a ship for transporting cargos such as containers, cargos are loaded not only in a hold below a deck but also on the deck. In a container ship for transporting containers, since cargos are accommodated in the containers, rain water does not enter the cargos in the containers even if the ship is caught in the rain during transportation or a cargo handling operation at a quay. On the other hand, a cargo ship for transporting cargos which need to be prevented from being wetted is, as described in Japanese Published Examined Application No. S47-13943, provided with a ceiling wall above a deck and includes a lower hold below the deck and an upper hold on the deck.

In order to increase the number of containers loaded on the container ship, a container ship described in Microfilm of Japanese Utility-Model Application Laid-Open Publication No. S61-27785 is provided with a retaining frame for containers on a shell of a hull above a draft line, and a container ship described in Microfilm of Japanese Utility-Model Application Laid-Open Publication No. S59-111792 is provided with a pendent member which extends outside a hull and is retractable on a deck.

On the other hand, an internal-combustion engine is generally used as a power source for driving a ship such as container ship and cargo ship, and a power generator is installed in a hull in order to supply power to electric equipments used in the ship. In a ship described in Japanese Patent Application Laid-Open Publication No. 2002-315195, a solar cell generates electric power to be supplied to electric equipments used in the ship. A solar boat described in Japanese Patent Application Laid-Open Publication No. H05-221381 is provided with a collapsible solar cell to generate energy for driving the boat.

A wing sail for using wind energy as a power source for driving a ship, as described in Japanese Patent Application Laid-Open Publication No. H05-139378, has a mast whose length is adjustable. Elongating or contracting the mast raises or reefs a sheet material as a sail.

SUMMARY OF THE INVENTION

As described in Japanese Published Examined Application No. S47-13943, the cargo ship is provided with the lower hold below the deck and the upper hold on the deck. On such a ship, a cargo handling operation is performed in the upper hold by lifting a cargo in the lower hold to the upper hold. That is, a cargo is loaded into the lower hold and is unloaded from the same to the outside of the ship through a hatch provided for the deck. The cargo handling operation may be performed in a relatively short time on a small cargo ship even when a cargo is moved between the upper and lower holds through the hatch. On a large container ship or cargo ship, however, the cargo handling operation becomes time-consuming and inefficient if the cargo handling operation for the lower hold is performed by using the hatch provided for the deck even when the hull is provided with the lower and upper holds.

Since an ordinary cargo ship or a container ship includes a whole hull, and a cargo handling operation needs to be performed on a single cargo handling operation yard provided at a quay, many vehicles for cargo handling operations come and go through the quay, and the cargo handling operability cannot be improved.

On the other hand, in a ship provided with a solar cell panel on a part of the deck, the solar cell can generate electric power only enough to be supplied to electric devices in the ship but cannot allow an electric motor to drive the ship. Furthermore as described in Microfilm of Japanese Utility-Model Application Laid-Open Publication No. S61-27785 and Microfilm of Japanese Utility-Model Application Laid-Open Publication No. S59-111792, the ship loaded with containers on the deck cannot ensure a space for mounting solar cells.

Also, as described in Japanese Patent Application Laid-Open Publication No. H05-139378, in the case where the wing sail is attached to a container ship or a cargo ship, the wing sail tends to hinder a cargo handling operation for cargos such as containers even though the mast is contracted to reef the sail made of a sheet material.

It is an object of the present invention to provide a ship capable of ensuring an efficient cargo handling operation for cargos such as containers.

It is another object of the present invention to provide a ship capable of ensuring an efficient cargo handling operation by keeping solar cells for supplying electric power to an electric motor for generating a thrust force of the ship from hindering the cargo handling operation.

It is still another object of the present invention to provide a ship capable of ensuring an efficient cargo handling operation by keeping a wing sail for supplying a thrust force to the ship by using wind energy from hindering the cargo handling operation.

It is yet another object of the present invention to provide a ship capable of ensuring an efficient cargo handling operation by allowing the cargo handling operation for one ship to be simultaneously performed at multiple places distant from each other.

A ship according to the present invention transports a cargo such as a container, the ship comprising: right and left protruding portions provided for a deck so as to protrude from a hull, which is provided for the hull and forms a lower hold in the hull; a plurality of portal frameworks each including vertical pillars fixed to respective ends of the right and left protruding portions and a horizontal beam through which the vertical pillars are connected to each other, the portal frameworks being placed at intervals in a longitudinal direction of the hull; a partition cover that is attached so as to be openable between the frameworks and forms an upper hold on the deck; and a guide rail for guiding an inboard crane that is provided below the deck and positioned in the lower hold, loads a cargo into the lower hold, and unloads a cargo overboard from the lower hold, wherein, when the partition cover is in an opened state, a cargo can be loaded by a quay crane provided at a quay into the upper hold and unloaded overboard from the upper hold, and a cargo can be loaded by the inboard crane into the lower hold and unloaded overboard from the lower hold.

In the ship according to the present invention, the partition cover functions as a solar cell that converts solar energy into electric energy, and when the partition cover is in a closed state, the solar cell supplies electric power to an electric motor for driving a screw that applies a thrust force in a navigation direction to the hull. The ship according to the present invention comprises: a wing sail including a post attached to the framework as to be swingable between a stand position and a storage position, a plurality of support beams provided for the post so as to extend horizontally, and a sheet material attached to the support beams.

The ship according to the present invention comprises: a screw that is provided for a stern side portion of the hull and applies a thrust force in a navigation direction to the hull by electric power from a battery provided in the hull; and a thruster that is provided for a bow side portion of the hull and applies a thrust force in a width direction and a thrust force in a navigation direction by electric power from the battery.

In the ship according to the present invention, the hull includes a bow module, a stern module, and at least one intermediate module that is provided between the bow module and the stern module and through which the bow module and the stern module are connected to each other, and the hull is of variable length. In the ship according to the present invention, at least one of the right and left protruding portions is provided with a lifter that guides a crew inboard and overboard.

According to the present invention, since the ship has a lower hold below a deck and an upper hold on the deck, the cargo handling operation for the lower hold is performed by an inboard crane provided in the lower hold, and the cargo handling operation for the upper hold is performed by a quay crane provided at a quay, it is possible to efficiently perform the cargo handling operation for the ship.

Since the upper hold is covered by the partition covers provided with solar cells, it is possible to apply, to the ship, a thrust force of a screw driven by an electric motor supplied with electric power from the solar cells. Furthermore, it is possible to efficiently perform the cargo handling operation for the upper hold by opening the partition covers.

Since the wing sail for applying a thrust force to the ship is made swingable between the stand position and the storage position, it is possible to efficiently perform the cargo handling operation without being hindered by the wing sail by having the wing sail take the storage position when the cargo handling operation is performed at a quay.

Since solar energy and wind energy are used as the thrust force of the ship, it is not necessary to consume fossil fuel for the thrust force of the ship by using an internal combustion engine or the like. Therefore, it is possible to allow the ship to navigate by using clean energy without releasing exhaust gas resulting from the internal combustion engine into the atmosphere.

Since the hull is constituted by the bow module, the stern module, and at least one intermediate module provided between the bow module and the stern module, it is possible to change the length or the load capacity of the ship on the basis of the quantity of cargos to be transported by the ship, and to efficiently transport cargos.

BRIEF DESCRIPTIONS OF THE DRAWINGS

BEST MODE FOR CARRYING OUT THE INVENTION

Figure 1:
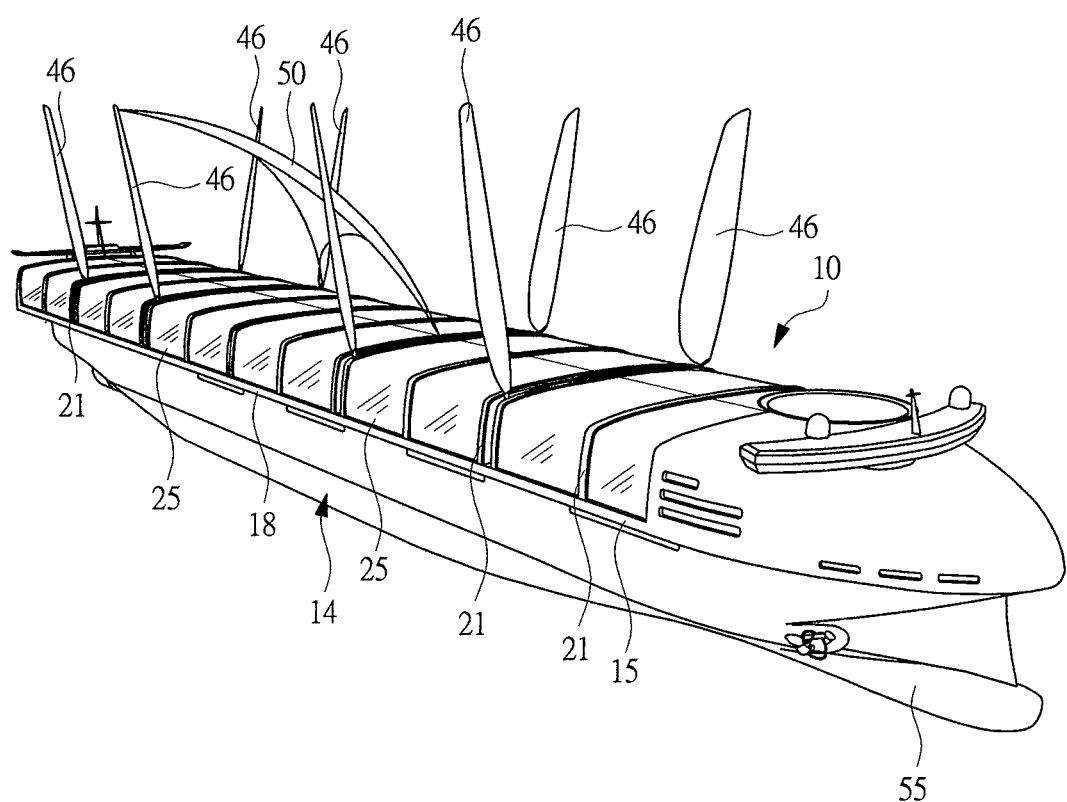
FIG. 1 is a perspective view showing an external appearance of a ship according to one embodiment of the present invention.

Hereinafter, one embodiment of the present invention will be described in detail with reference to the accompanying drawings. A ship 10 of the present invention shown in FIG. 1 is embodied as a container ship for performing ocean transportation of containers.

Figure 4:
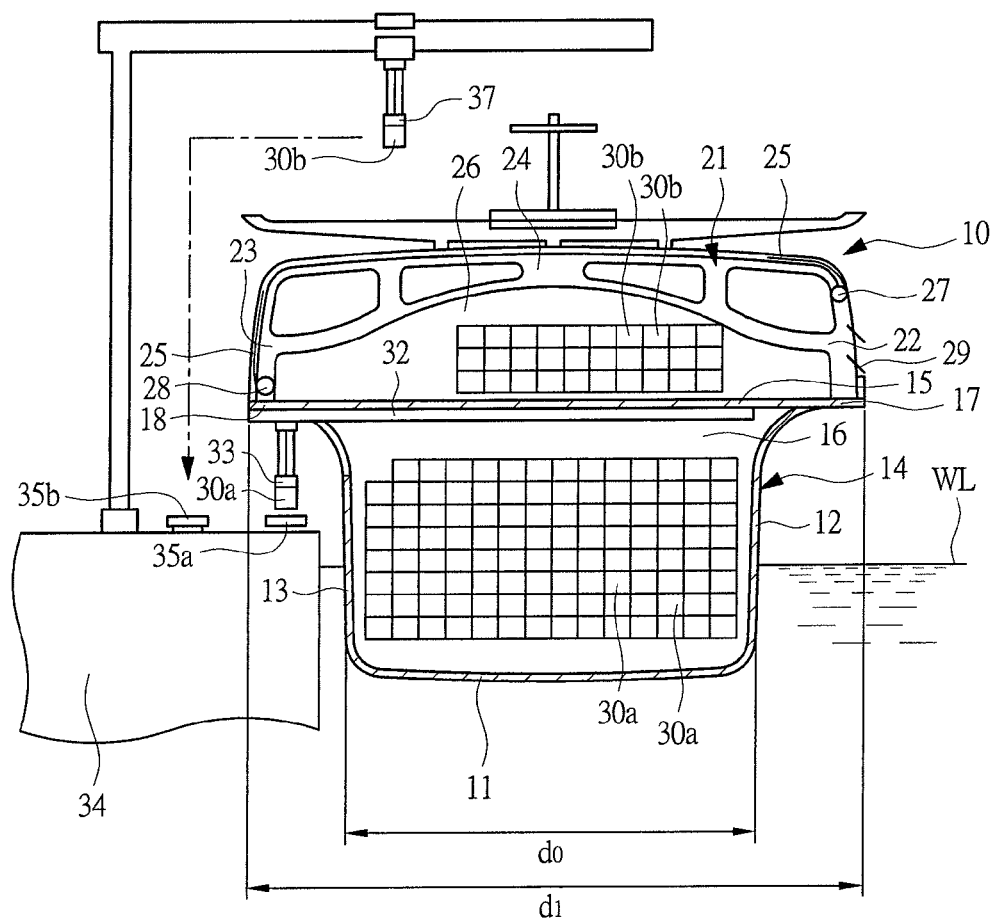
FIG. 4 is a transverse sectional view of the ship in which the cargo handling operation is being performed.

As shown in FIG. 4, the ship 10 has a hull 14 having a ship bottom 11 and right and left side shells 12 and 13 integrally formed with the ship bottom 11, and portions outwardly curved in a width direction of the hull 14 are provided for respective upper end portions of the right and left side shells 12 and 13. An upper deck, that is, a deck 15 is provided for the upper end portions of the right and left side shells 12 and 13, and a lower hold 16 partitioned by the ship bottom 11, the right and left side shells 12 and 13, and the deck 15 is formed in the hull 14.

Figure 2:
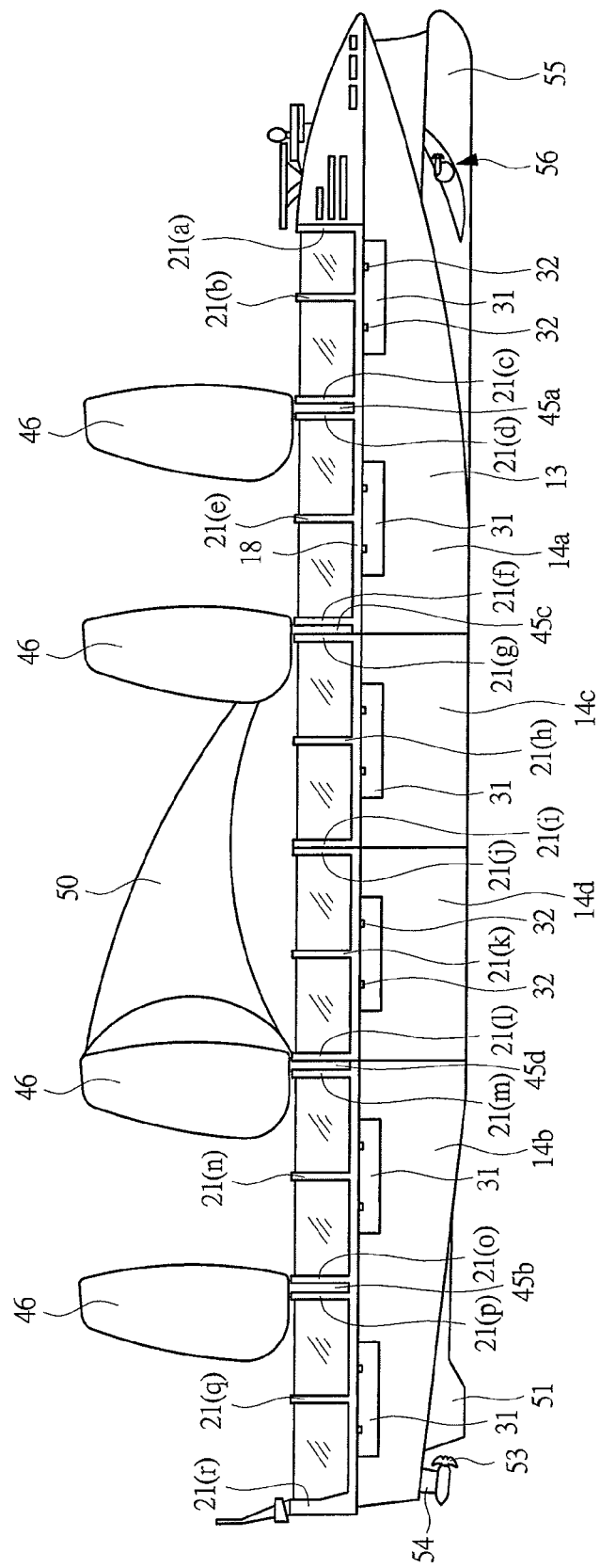
FIG. 2 is a right side view of the ship shown in FIG. 1.
Figure 3:
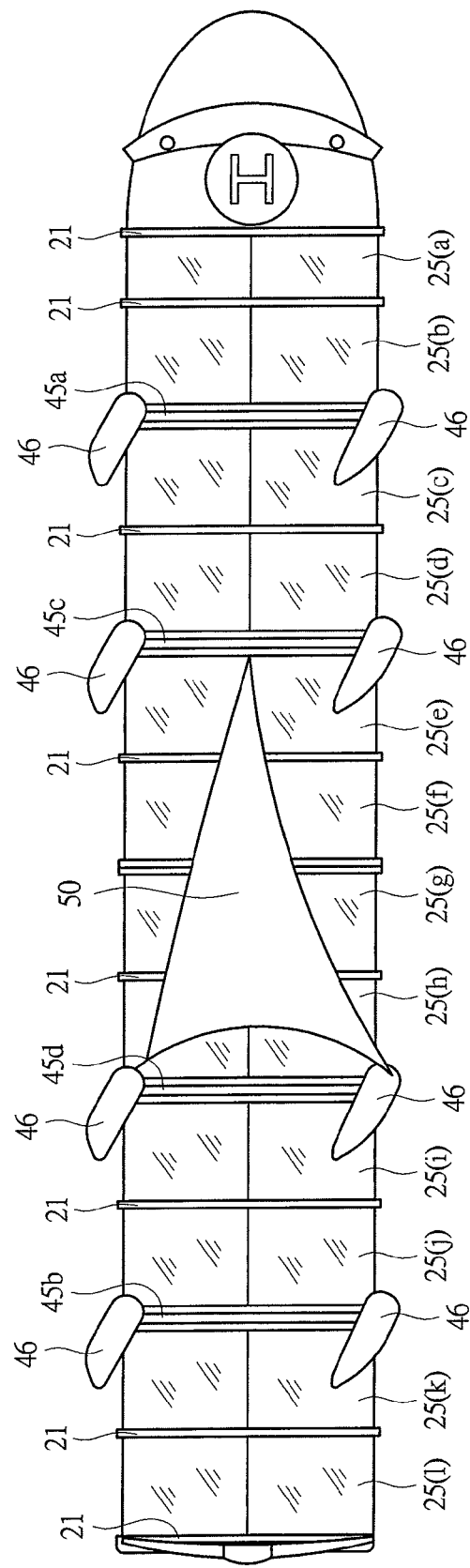
FIG. 3 is a plan view of the ship shown in FIG. 2.

The deck 15 has portions protruding from the right and left side portions of the hull 14. In FIG. 4, when the hull 14 is assumed to have a width of "D0", a width "D1" of the deck 15 is larger than "D0", and reference numerals 17 and 18 denote right and left protruding portions, respectively. As shown in FIGS. 1 to 3, the deck 15 is provided with multiple portal frameworks 21 placed at intervals in the longitudinal direction of the hull 14. As shown in FIG. 4, each framework 21 includes vertical pillars 22 and 23 fixed to respective ends of the protruding portions 17 and 18 and a horizontal beam 24 through which the vertical pillars 22 are connected to each other. The hull 14 is provided with a total of 18 frameworks 21. In FIG. 2, reference symbols (a) to (r) are given to the respective frameworks in order of arranging from the framework 21 at the bow to the framework 21 at the stern. The number of the frameworks 21 provided for the hull 14 is 18 in the ship 10 shown in the drawings, but varied with length of the hull 14.

An openable partition cover 25 is provided between two frameworks 21 which are paired and are adjacent to each other in the longitudinal direction of the hull 14. The framework 21 and the partition cover 25 form an upper hold 26 on the deck 15. The ship 10 shown in the drawings is provided with 12 partition covers 25 between corresponding pairs of the frameworks 21, and as shown in FIG. 3, reference symbols (a) to (l) are given to the respective partition covers in order of arranging from the partition cover 25 at the bow to the partition cover 25 at the stern. Each partition cover 25 is made of a sheet-like flexible member provided with a solar cell which converts solar energy into electric energy, and is slidably attached along guide grooves formed in the corresponding frameworks 21. Each partition cover 25 is halved in the width direction of the hull 14, and as shown in FIG. 3, the partition cover 25 reaches a closed state when the right and left partition covers 25 come into contact with each other.

As shown in FIG. 4, a wind-up roll 27 is provided for the upper end portion of one vertical pillar 22, and a wind-up roll 28 is provided for the bottom end portion of the other vertical pillar 23. Therefore, the partition cover 25 reaches an opened state when the halved partition covers 25 are wound up by the respective wind-up rolls 27 and 28. On the other hand, the partition cover 25 reaches a closed state as shown in FIGS. 1 to 3 when the halved partition cover 25 are unwound from the respective wind-up rolls 27 and 28. When the partition cover 25 is in a closed state, a solar cell provided for the partition cover 25 generates electric power, and the generated power is charged in a battery (not shown) provided in the hull 14.

As shown in FIG. 4, the wind-up roll 27 for winding up the portside partition cover 25 is provided for the upper end portion of the vertical pillar 22, and an openable window 29 is provided below the wind-up roll 27. Since the openable window 29 is attached to a frame (not shown) so as to be freely opened and closed, it is possible to ventilate the upper hold 26 by opening the openable window 29 and adjust the temperature and the humidity in the upper hold 26. Since the openable window 29 is provided with a solar cell as well as the partition cover 25, it is possible to improve power generation efficiency of the solar cell provided for the openable window 29 by adjusting an open angle of the openable window 29 to the sun.

Openable windows 29 provided with solar cells may be provided below the respective wind-up rolls 27 by providing the portside wind-up rolls 27 for the respective upper end portions of the vertical pillars 22. Furthermore, openable windows 29 may be provided at intervals in a longitudinal direction of the hull 14. In this case, the wind-up roll 27 for winding the partition cover 25 corresponding to a portion for which the openable window 29 is not provided is provided for the lower side portion of the vertical pillar 22.

As shown in FIG. 4, the openable window 29 is provided on the portside. However, the openable window 29 may be provided on the starboard side. In this case, the wind-up roll 28 is provided for the upper end portion of the vertical pillar 23. In this way, it is possible to enhance the generating efficiency by providing the openable windows 29 with solar cells for both the portside and the starboard side.

Since the lower hold 16 is provided below the deck 15 in the hull 14 and the upper hold 26 is provided on the deck 15, as shown in FIG. 4, containers 30*a* are placed in the lower hold 16, and containers 30*b* are placed in the upper hold 26. Since the partition covers 25 shelter the upper hold 26 from the outside of the ship 10, the partition covers 25 can prevent drops of rainwater or seawater from sticking to or scattering over the containers 30*b* when the ship 10 is under way. In addition, the partition covers 25 covering the containers 30*b* in the upper hold 26 can charge a battery by converting solar energy into electric energy when the ship 10 is under way.

As shown in FIG. 2, since multiple opening and closing doors 31 as gate doors are provided for the upper portion of the starboard side shell 13 of the hull 14, it is possible to allow operations of loading the containers 30*a* into the lower hold 16 and unloading the containers 30*a* from the lower hold 16 to the outside of the ship to be performed by keeping the opening and closing doors 31 open. Guide rails 32 corresponding to the opening and closing doors 31 are attached below the deck 15, and each guide rail 32 extends to the starboard side protruding portion 18. As shown in FIG. 4, each guide rail 32 is provided with an inboard crane 33 for cargo handling operation such as loading operation of the containers 30*a* into the lower hold 16 and unloading operation of the containers 30*a* from the lower hold 16 to the outside of the ship.

FIG. 4 shows a state in which an unloading operation is being performed at a quay 34, and the inboard crane 33 provided in the lower hold 16 unloads the container 30*a* from the lower hold 16 to the outside of the ship, and loads it onto a truck 35*a* at the quay 34. The quay 34 is provided with a quay crane 37 for unloading the container 30*b* from the upper hold 26. This quay crane 37 loads the container 30*b* in the upper hold 26 onto a truck 35*b* at the quay 34. FIG. 4 shows a state in which an unloading operation of the containers 30*a* and 30*b* from the ship 10 is being performed. In the same way, when the containers 30*a* and 30*b* are loaded into the ship 10 from the quay 34, the inboard crane 33 loads the container 30*a* into the lower hold 16, and the quay crane 37 loads the container 30*b* into the upper hold 26. In this manner, since the ship 10 is provided with the lower hold 16 and the upper hold 26 as a two-tiered structure, and it is possible to simultaneously perform the cargo handling operation for the lower hold 16 and the upper hold 26, it is possible to efficiently perform the cargo handling operation.

In addition, since multiple opening and closing doors 31 are provided as shown in FIG. 2, the cargo handling operation for the lower hold 16 can be simultaneously performed at multiple places by opening all of the doors. Furthermore, the cargo handling operation for the upper hold 26 can be also simultaneously performed at multiple places by opening all of the partition covers 25. Since the partition covers 25 are opened and removed from areas around the horizontal beams 24 of the frameworks 21 when the cargo handling operation for the upper hold 26 is performed, it is possible to efficiently perform the cargo handling operation without being hindered by the partition covers 25 as solar cells.

The opening and closing doors 31 are provided for the starboard side shell 13 of the ship 10 as shown in FIG. 4. However, the opening and closing doors 31 may be provided for the portside shell 12 or both side shells 12 and 13. In the case where the opening and closing doors 31 are provided for both side shells 12 and 13, the guide rails 32 protrude to the right and left protruding portions 17 and 18. Furthermore, while the guard rails 32 protrude to the protruding portion 18, if an end portion of the guard rail 32 is slidable with respect to a base end portion in the lower hold 16, the end portion of the guard rail 32 protrudes to the protruding portion 18 during a cargo handling operation.

As shown in FIG. 2, the hull 14 has a bow module 14*a*, a stern module 14*b*, and two intermediate modules 14*c* provided between the bow module 14*a* and the stern module 14*b*, and the hull 14 of one ship is constituted by connecting those modules. It is possible to change the length of the hull 14 by changing the configuration of the hull 14 from a hull only having the bow module 14*a* and the stern module 14*b* to the hull further having one or more intermediate module. In this way, it is possible to change the load capacity of the hull 14 by changing the length of the hull 14 on the basis of the quantity of cargos to be loaded into the ship 10, and to perform the cargo handling operation by separately using quay cranes 37.

Figure 5A:
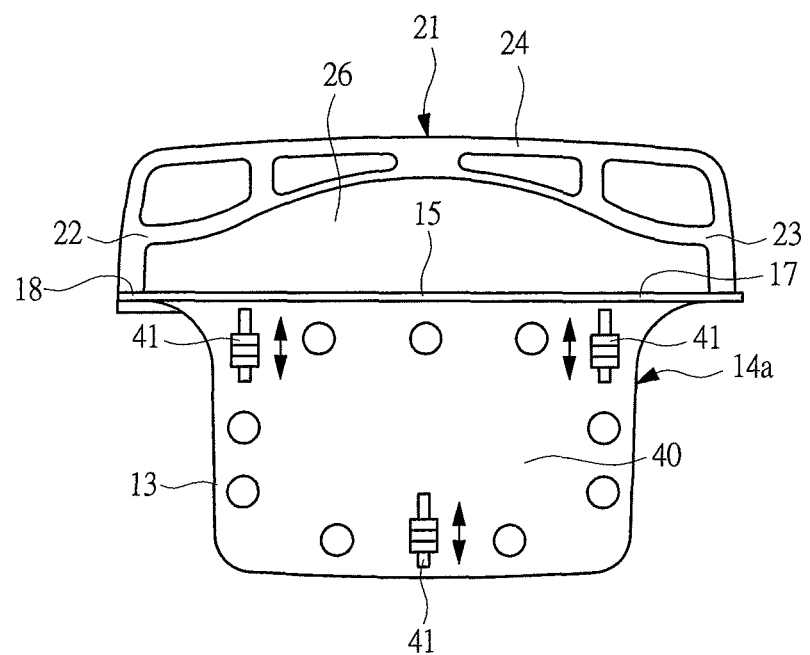
FIG. 5A is a rear view showing a rear end surface of a bow module of the hull.
Figure 5B:
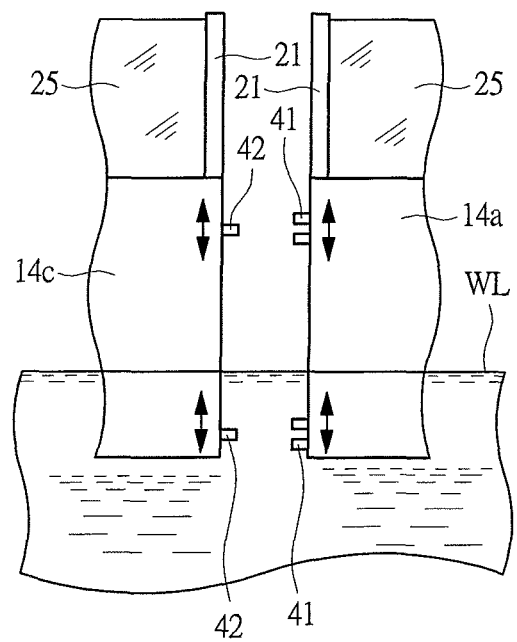
FIG. 5B is a side view showing a mechanism for connecting the bow module with an intermediate module.

FIG. 5A is a rear view showing a rear end surface of the bow module 14*a*, and FIG. 5B is a side view showing a mechanism for connecting the bow module with the intermediate module.

As shown in FIG. 5A, since the rear end portion of the bow module 14*a* is provided with an end wall 40, and the lower hold 16 of the bow module 14*a* is closed, the bow module 14*a* can navigate by itself. Since both end portions of the intermediate modules 14c and 14d are provided with respective end walls (not shown), and the lower hold 16 of each of the intermediate modules 14c and 14d is closed, each of the intermediate modules 14c and 14d is floatable on the water. Since the front end portion of the stern module 14b is also provided with a bulkhead (not shown), and the lower bold 16 of the stern module 14b is closed, the stern module 14b can navigate by itself.

As shown in FIG. 5, multiple first joint members 41 are attached to the end wall 40 of the bow module 14a in an adjustably movable manner in a vertical direction, and multiple second joint members 42 are attached to the front end wall of the intermediate module 14c in an adjustably movable manner in a vertical direction so as to correspond to the first joint members 41. Therefore, the bow module 14a and the intermediate module 14c are connected to each other by adjusting vertical heights of the joint members 41 and 42, keeping both modules 14a and 14c in contact with each other, and fastening both joint members 41 and 42.

Similarly, the first joint members 41 are attached to the end wall of the rear portion of the intermediate module 14c, and the second joint members 42 are attached to the end wall of the front portion of the intermediate module 14d. Also, the first joint members 41 are attached to the end wall of the rear portion of the intermediate module 14d, and the second joint members 42 are attached to the end wall of the front portion of the stern module 14b. Therefore, the hull 14 is composed of four modules by fastening the joint members 41 and 42 of the respective modules to each other.

As a structure of the hull 14 of one ship, the hull 14 may be produced to have a structure made up of a single module like an ordinary ship instead of configuring the hull 14 by connecting multiple modules as mentioned above. However, the hull 14 of one ship enables the cargo handling operation to be separately performed in multiple areas and to be performed efficiently by having a module connection structure.

Figure 6A:
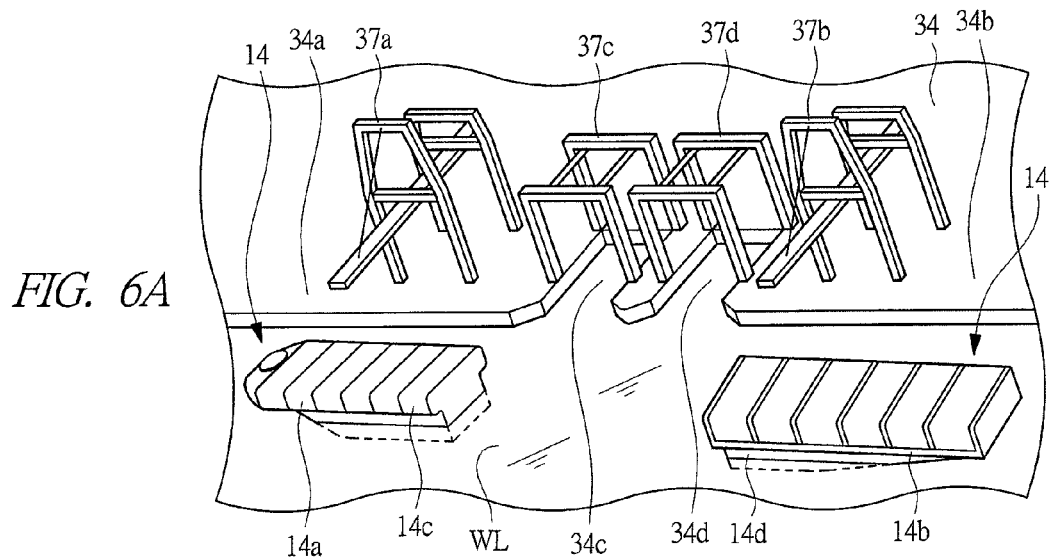
FIGS. 6A to 6C are cargo handling operation process charts exemplifying a cargo handling operation for the ship having a module connection structure.
Figure 6B:
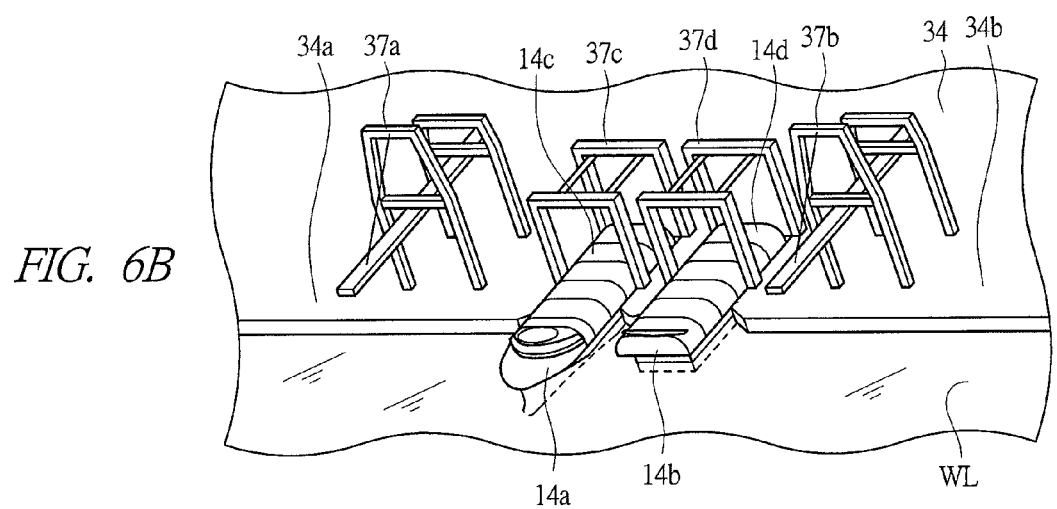
Figure 6C:
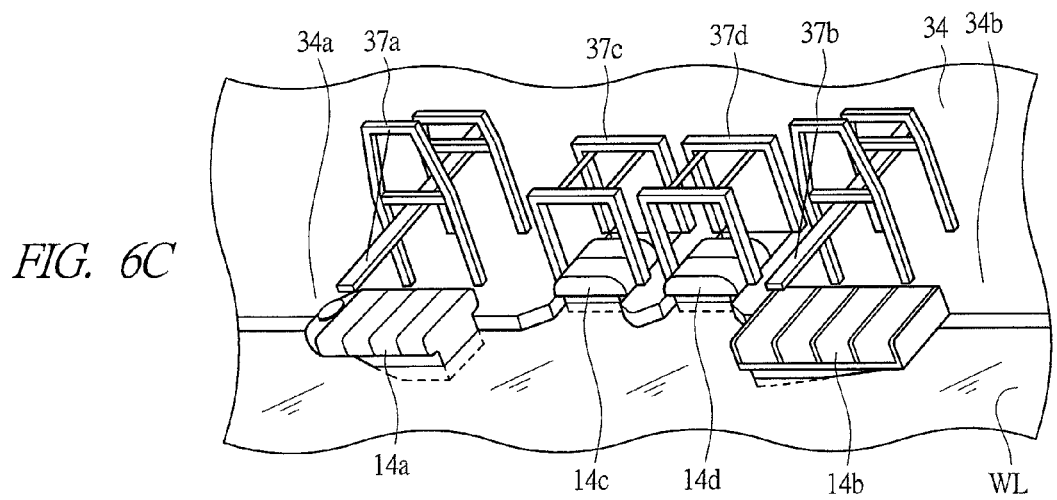

FIGS. 6A to 6C are cargo handling operation process charts exemplifying a cargo handling operation for the ship 10 having the module connection structure as shown in FIGS. 1 to 3. Firstly, the hull 14 approaches the quay and is separated at the connection of the intermediate modules 14c and 14d as shown in FIG. 6A. In this way, the hull 14 is separated into two parts, that is, one including the bow module 14a and the intermediate module 14c connected to each other and the other including the stern module 14b and the intermediate module 14d connected to each other. Under this condition, as shown in FIG. 6B, one including the bow module 14a and the intermediate module 14c connected to each other navigates to a cargo handling dock 34c, and the other including the stern module 14b and the intermediate module 14d connected to each other navigates to a cargo handling dock 34d.

Then, as shown in FIG. 6C, the bow module 14a is separated from the intermediate module 14c, and comes alongside a cargo handling operation yard 34a of the quay 34 while the intermediate module 14c is left in the cargo handling dock 34c. Similarly, the stern module 14b is separated from the intermediate module 14d, and comes alongside a cargo handling operation yard 34b of the quay 34 while the intermediate module 14d is left in the cargo handling dock 34d. The cargo handling operation yards are provided with respective quay cranes 37a and 37b, and the cargo handling docks 34c and 34d are provided with respective quay cranes 37c and 37d.

Figure 7:
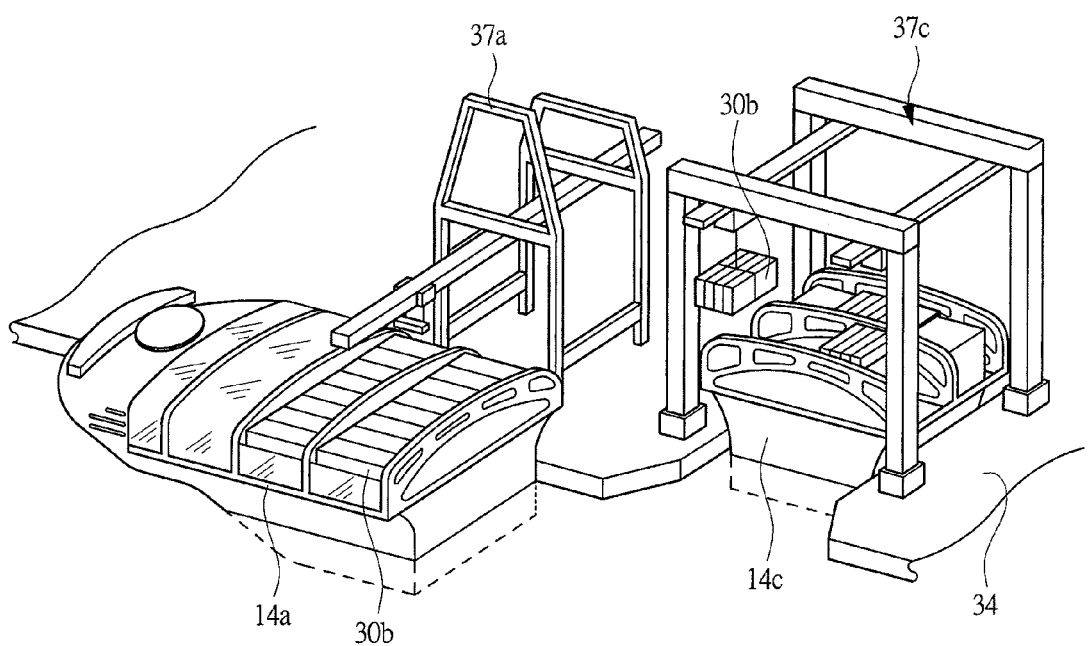
FIG. 7 is an enlarged view showing a state in which the cargo handling operation for the bow and intermediate modules shown in FIG. 6C is being performed.

FIG. 7 is an enlarged view showing the bow module 14a and the intermediate module 14b shown in FIG. 6C, and it shows a state in which cargo handling operations for respective modules are being performed.

Therefore, the cargo handling operation for the containers 30b in the four separated upper holds 26 can be simultaneously performed by the quay cranes 37a to 37d. At the same time, the cargo handling operation for the containers 30a in the four separated lower holds 16 can be simultaneously performed by the inboard cranes 33. Accordingly, by dividing the hull 14 into four modules, the cargo handling operation for the upper hold 26 of one ship 10 can be efficiently performed by using the multiple quay cranes 37a to 37d.

A storage space 45a is provided between the frameworks which are denoted by reference characters 21(c) and 21(d) in the frameworks 21 provided for the bow module 14a, and a storage space 45b is provided between the frameworks which are denoted by reference characters 21(o) and 21(p) in the frameworks 21 provided for the stern module 14b. Furthermore, a storage space 45c is provided between the framework 21(f) provided for the rear end portion of the bow module 14a and the framework 21(g) provided for the front end portion of the intermediate module 14c, and a storage space 45d is provided between the framework 21(m) provided for the front end portion of the stern module 14b and the framework 21(l) provided for the rear end portion of the intermediate module 14d. Wing sails 46 are attached to the frameworks 21 corresponding to the storage spaces 45a to 45d on the right and left side portions of the hull 14.

Figure 8:
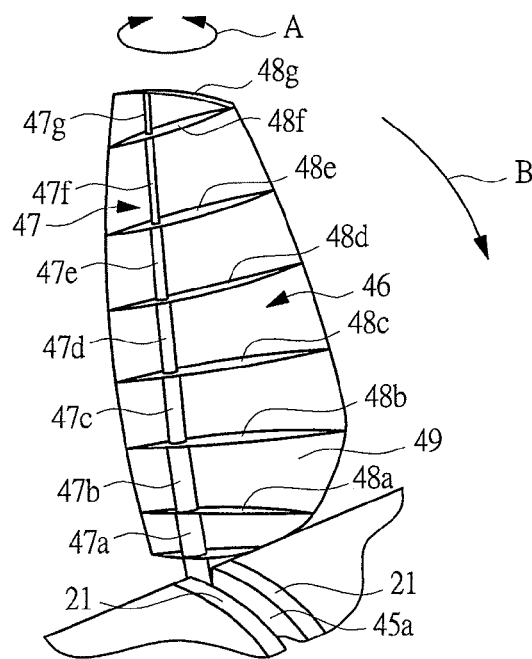
FIG. 8 is a perspective view showing a wing sail positioned at a storage space and provided for a framework.

FIG. 8 is a perspective view showing the wing sail 46 which is positioned at the storage space 45a and is provided for the framework 21. The wing sail 46 has a post 47 composed of multiple post pieces 47a to 47g having gradually decreasing outside diameters from the base end portion to the tip portion. The post pieces forming the post 47 is hollow and have a nested structure in which the post piece on the tip side is slidably inserted into the corresponding post piece on the base end side. The post 47 is formed to be telescopic as a whole. The post pieces 47a to 47g are provided with horizontally extending support beams 48a to 48g, and a sheet material 49 is attached to the support beams 48a to 48g.

Figure 9:
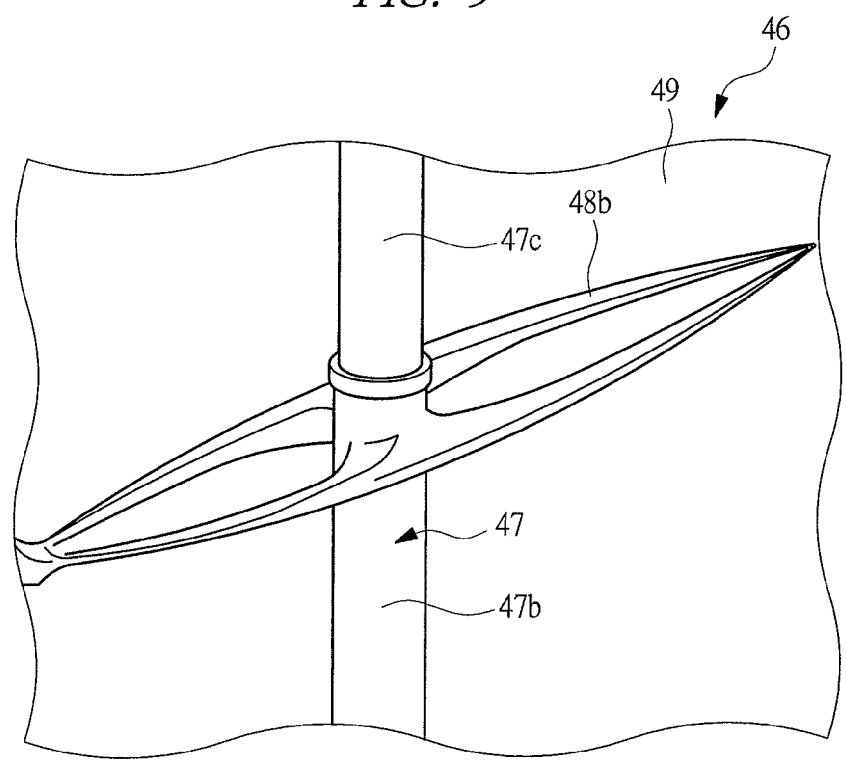
FIG. 9 is a perspective view showing post pieces of the wing sail shown in FIG. 8 and horizontal beams provided for the post pieces.

FIG. 9 is a perspective view showing the post piece 47b of the wing sail 46 and the horizontal beam 48c provided for the same, and horizontal beam becomes wider toward the post and becomes narrower toward the tip. FIGS. 8 and 9 show the wing sail provided for the storage space 45a, and the other wing sails provided for the storage spaces 45b to 45d are similarly structured. Since the wing sail 46 has the telescopic post 47, the entire length thereof can be shortened by slidably inserting the post piece on the base end side into the corresponding post piece on the tip side. The base end side post piece 47a is rotatably attached to the framework 21 as indicated by arrow "A" in FIG. 8 and is made swingable as indicated by arrow "B" between a stand position and a storage position inside the storage space.

Therefore, since the wing sails 46 are stored in the respective storage spaces 45a to 45d during the cargo handing operation, it is possible to prevent the wing sails 46 from hindering the cargo handling operation. On the other hand, when the ship 10 is under way, it is possible to apply a thrust force to the ship 10 by using wind energy received by the wing sail 46. The ship 10 shown in drawings is provided with 8 wing sails 46 in total. However, any number of wing sails 46 may be provided.

In addition to the wing sails 46, a sheet-like three-cornered sail 50 is attached to the framework 21 and one wing sail 46. Since two corners of the three-cornered sail 50 are fixed to the framework 21, and the remaining corner is fixed to the tip of the wing sail 46, this three-cornered sail 50 can add wind energy to a thrust force for the ship 10. The three-cornered sail 50 is folded for storage when it is not necessary to the ship 10 does not navigate.

Figure 10A:
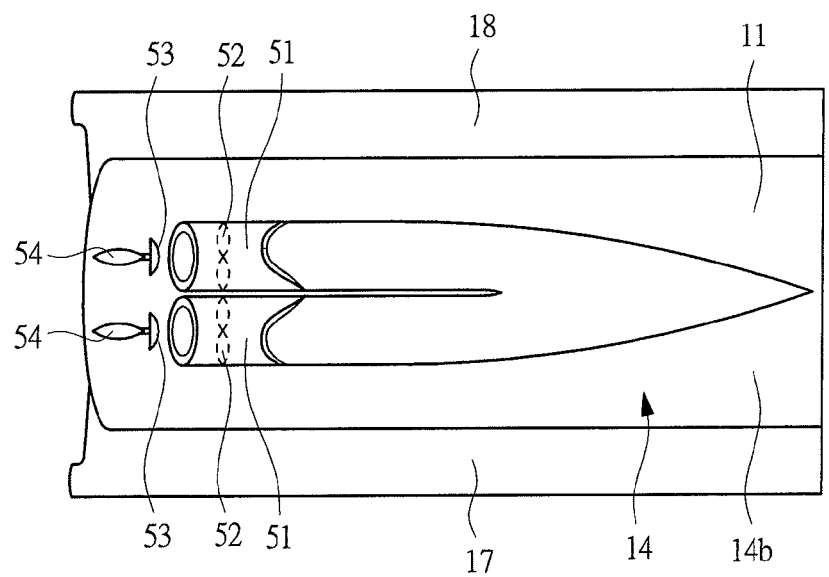
FIG. 10A is a bottom view of a stern module.
Figure 10B:
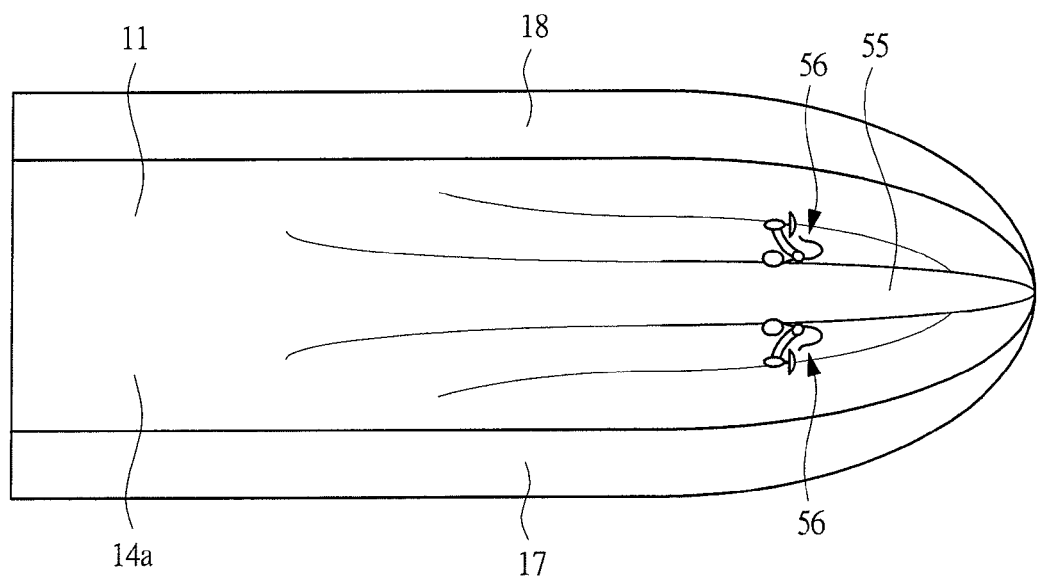
FIG. 10B is a bottom view of a bow module.

FIG. 10A is a bottom view of the stern module 14b, and FIG. 10B is a bottom view of the bow module 14a.

As shown in FIG. 10A, the stern module 14b is provided with two propulsion tubes 51 so as to extend in the longitudinal direction at the ship bottom 11. The propulsion tubes 51 are opened at both ends, and primary screws 52 are equipped in respective propulsion tubes 51 as indicated by a broken line. Secondary screws 53 are attached to respective steering portions 54 at the rear of the propulsion tubes 51, and the secondary screws 53 can apply a thrust force in a navigation direction to the hull 14. Furthermore, rotating the steering portions 54 and driving the secondary screws 53 can apply a thrust force in the width direction to the hull 14, and the secondary screws 53 function as a stern thruster.

The primary and secondary screws 52 and 53 are driven by electric motors (not shown) provided inside the hull 14, and the electric motors are supplied with power directly from solar cells provided for the partition covers 25 or from a battery provided in the hull 14. As described above, since the stern module 14b is provided with the screws 52 and 53, as shown in FIG. 6A, when the stern module 14b and the intermediate module 14d navigate, a thrust force generated from the screws 52 and 53 enables the stern module 14b and the intermediate module 14d to navigate. The stern module 14b can independently navigate using the screws 52 and 53.

As shown in FIG. 2, the ship bottom 11 of the bow module 14a slopes upward toward the bow, and a center elevated portion 55 is provided for a bow area of the ship bottom 11. Multi-bow thrusters 56 are respectively provided for the right and left side portions of the elevated portion 55.

Figure 11A:
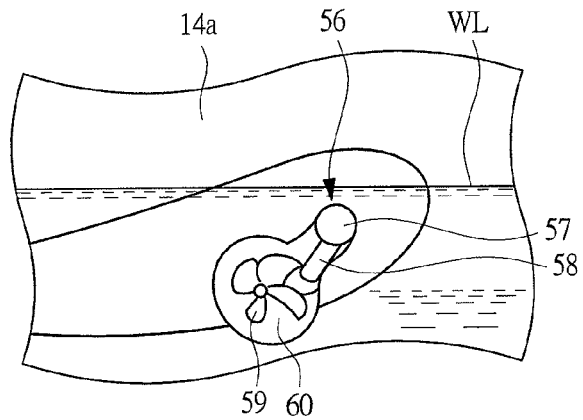
FIGS. 11A to 11C are enlarged side views each of which shows a multi-bow thruster provided for the stern module.
Figure 11B:
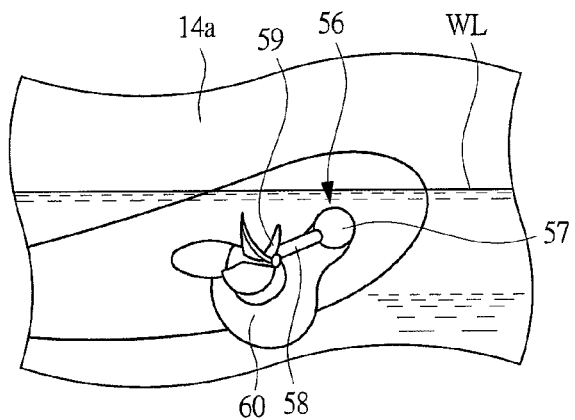
Figure 11C:
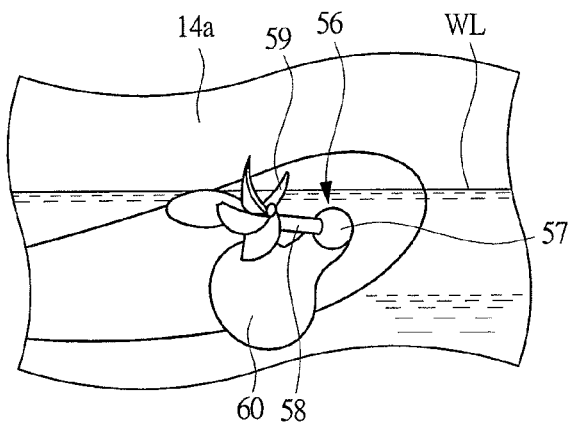

FIGS. 11A to 11C are enlarged side views each showing the multi-bow thruster 56 provided for the starboard side portion of the elevated portion 55, the multi-bow thruster 56 includes a movable holder 58 attached to a globular joint portion 57, and a bow-side screw 59 is provided for the tip portion of the movable holder 58. The bow-side screw 59 is driven by an electric motor provided in the hull 14 as well as the primary and secondary screws 52 and 53 on the stern.

As shown in FIG. 11A, the screw 59 of the multi-bow thruster 56 is oriented in the width direction of the hull 14 under the state that the screw 59 is positioned in a depressed portion 60 provided for the elevated portion 55. When the screw 59 is driven in this state, it can apply a thrust force in the width direction to the hull 14 so that the hull 14 can approach the quay, for example.

Meanwhile, as shown in FIG. 11B, when the screw 59 of the multi-bow thruster 56 is oriented in the navigation direction in the water, and driven in this position, it applies a thrust force in the navigation direction to the hull 14. Furthermore, as shown in FIG. 11C, when the screw 59 is made to protrude above a water level "WL" and is oriented in the navigation direction, it generates many bubbles which are guided along a depressed portion provided for the center elevated portion 55 and are applied to the ship bottom. In this way, a hull friction resistance is decreased, and the ship 10 can navigate with a decreased driving power.

As described above, since the bow module 14a is provided with the multi-bow thruster 56 having the screw 59, as shown in FIG. 6A, when it is necessary to allow the bow module 14a and the intermediate module 14c to navigate by themselves, the bow module 14a and the intermediate module 14c can navigate with a thrust force generated from the screw 59 of the multi-bow thruster 56. The bow module 14a can independently navigate using the screw 59.

The screws 52, 53, and 59 which apply the thrust force to the ship 10 is driven by the electric motors, and the power to the electric motors are supplied from the solar cells or via a battery by converting the solar energy into the electric energy by the solar cells provided for the partition covers 25. In addition, the ship 10 is provided with the wing sails 46 and the three-cornered sail 50 in order to convert the wind energy into the thrust force for the ship 10. In this way, the ship 10 can economically navigate using the solar energy and the wind energy without using an internal combustion engine and consuming fossil fuel. When the ship 10 navigates faster, a fuel battery (not shown) mounted in the lower hold 16 adds electric energy and it is possible to adjust electric energy.

A wide area is needed to supply power to the electric motor which drives the screws, but since the solar cells are provided for the partition covers 25 which are formed so as to cover the upper hold 26 of the ship 10, it is possible to ensure enough electric power to drive the ship by using the top area of the ship 10. In addition, since the partition covers 25 as the solar cells are capable of opening and closing, when the partition covers 25 are in an opened state, it is possible to smoothly perform the cargo handling operation without being hindered by the partition covers 25.

Figure 12:
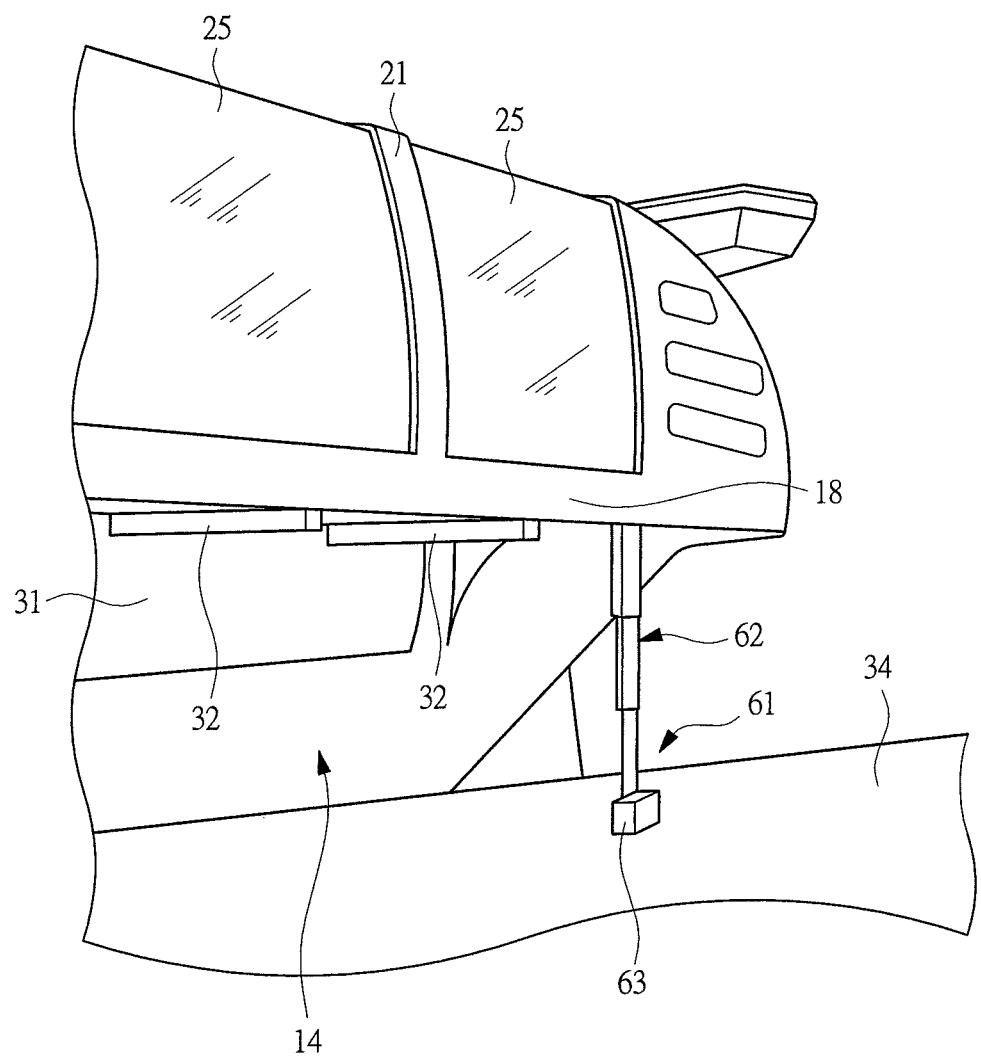
FIG. 12 is an enlarged perspective view showing a part of the bow module of the ship.

FIG. 12 is a partially enlarged perspective view showing the bow module 14a of the ship 10. A bridge and a residential area are provided above the deck at the bow of the ship 10. As shown in FIG. 12, the starboard side protruding portion 18 is provided with a lifter 61 for guiding the crew between the inside and outside of the ship. The lifter 61 has a telescopic lift post 62 and a carrier 63 which is provided for the bottom end portion of the lift post 62 and allows the crew to get on board. The lift post 62 has post pieces whose sizes decrease from the upper end portion to the lower end portion. The lower post piece is nested inside the upper post piece. Using the lifter 61, the crew can pass between the quay and the ship 10 or between the ship 10 and a smaller ship.

Providing the protruding portion 18 with the lifter 61 allows the crew to move between the inside and the outside of the ship more safely than the case of using a ladder. The lifter 61 may be provided for the portside protruding portion 17 or for the protruding portions 17 and 18 on both sides.

The lifter 61 may have not only the telescopic structure having the nested lift post 62 as shown in FIG. 12 but also a structure in which the carrier 63 is moved vertically by using a wire or the like.

The present invention is not limited to the above-mentioned embodiment, and various changes and modifications may be made in the present invention without departing from the spirit and scope thereof. For example, the ship 10 shown in the drawings represents a container ship which transports containers, but a cargo to be transported is not limited to the container, and the present invention is also applicable to cargo ships which transport various cargos.

The ship according to the present invention is applied to a container ship and a cargo ship, and solar energy and wind energy are used as a thrust force of the ship.

Although the invention above has been described in connection with preferred embodiments of the invention, it will be evident for a person skilled in the art that several modifications are conceivable without departing from the invention as defined by the following claims.

While the present invention has been illustrated and described with respect to a particular embodiment thereof, it should be appreciated by those of ordinary skill in the art that various modifications to this invention may be made without departing from the spirit and scope of the present.

What is claimed is:

1. A ship that transports a cargo such as a container, the ship comprising:
   a deck having right and left protruding portions protruding in a width direction of a hull from respective upper end portions of right and left side shells of the hull, the deck forming a lower hold in the hull;
   a plurality of portal frameworks each including vertical pillars fixed to respective ends of the right and left protruding portions and a horizontal beam through which the vertical pillars are connected to each other, the portal frameworks being placed at intervals in a longitudinal direction of the hull;
   a partition cover that is attached so as to be openable between the portal frameworks, the partition cover and the portal frameworks collectively form, on the deck, an upper hold which is larger in width than the lower hold and separated from the lower hold by the deck; and
   a guide rail for guiding an inboard crane that is provided below the deck and positioned in the lower hold, and adapted to load a cargo into the lower hold, and to unload a cargo from the lower hold, the guide rail having a base end portion in the lower hold, and an end portion slidable with respect to the base end portion in the width direction of the hull so as to protrude to each protruding portion.

2. The ship according to claim 1, wherein the partition cover functions as a solar cell that converts solar energy into electric energy, and when the partition cover is in a closed state, the solar cell supplies electric power to an electric motor for driving a screw that applies a thrust force in a navigation direction to the hull.

3. The ship according to claim 1, comprising:
   a wing sail which is moved between a stand position at which the wing sail applies a thrust force in a navigation direction to the hull, and a storage position at which the wing sail is stored in a storage space without applying a thrust force to the hull,
   wherein the wing sail includes a post swingably attached to one of the portal frameworks, a plurality of support beams attached to the post so as to extend horizontally, and a sheet material attached to the support beams.

4. The ship according to claim 1, comprising: a screw that is provided for a stern side portion of the hull and applies a thrust force in a navigation direction to the hull by electric power from a battery provided in the hull; and a thruster that is provided for a bow side portion of the hull and applies a thrust force in a width direction and a thrust force in a navigation direction by electric power from the battery.

5. The ship according to claim 1, wherein the hull includes a bow module, a stern module, and at least one intermediate module that is provided between the bow module and the stern module and through which the bow module and the stern module are connected to each other, and the hull is of variable length.

6. The ship according to claim 1, wherein at least one of the right and left protruding portions is provided with a lifter that guides a crew inboard and overboard.

* * * * *